(12) United States Patent
Lee et al.

(10) Patent No.: US 8,372,548 B2
(45) Date of Patent: Feb. 12, 2013

(54) ORGANIC ELECTROLYTIC SOLUTION AND LITHIUM BATTERY EMPLOYING THE SAME

(75) Inventors: Seok-soo Lee, Suwon-si (KR);
Young-gyoon Ryu, Suwon-si (KR);
Dong-joon Lee, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 653 days.

(21) Appl. No.: 12/550,552

(22) Filed: Aug. 31, 2009

(65) Prior Publication Data

US 2010/0119952 A1    May 13, 2010

(30) Foreign Application Priority Data

Nov. 13, 2008    (KR) .................. 10-2008-0112872

(51) Int. Cl.
*H01M 6/16* (2006.01)
(52) U.S. Cl. ........ 429/334; 429/332; 429/330; 429/326; 429/307; 252/62.2
(58) Field of Classification Search .................. 429/334, 429/332, 330, 326, 307; 252/62.2
See application file for complete search history.

(56) References Cited

U.S. PATENT DOCUMENTS

| | | | |
|---|---|---|---|
| 6,245,465 B1 | 6/2001 | Angell et al. | |
| 2008/0102377 A1 * | 5/2008 | Abe et al. | 429/338 |

FOREIGN PATENT DOCUMENTS

| | | | |
|---|---|---|---|
| JP | 10-64584 | | 3/1998 |
| JP | 10-241586 | | 9/1998 |
| JP | 2005-056841 | | 3/2005 |
| JP | 2005-108440 | | 4/2005 |
| JP | 2007-149535 | * | 6/2007 |
| JP | 2008-532209 | | 8/2008 |
| WO | WO 2006/078866 A2 | | 7/2006 |

* cited by examiner

*Primary Examiner* — Laura Weiner
(74) *Attorney, Agent, or Firm* — Lee & Morse, P.C.

(57) ABSTRACT

An organic electrolytic solution including: a lithium salt; an organic solvent; and a compound represented by Formula 1 below, and a lithium battery including the organic electrolytic solution.

<Formula 1>

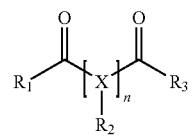

In Formula 1: R1, R2, and R3 may be each independently a hydrogen atom, a C1 to C10 alkyl group, a C6 to C10 cycloalkyl group, a C6 to C10 aryl group, a C2 to C10 alkenyl group, or a C2 to C10 alkynyl group; X is C (R2) or nitrogen; and n is an integer ranging from 1 to 5.

14 Claims, 2 Drawing Sheets

ORGANIC ELECTROLYTIC SOLUTION AND LITHIUM BATTERY EMPLOYING THE SAME

CROSS-REFERENCE TO RELATED APPLICATION

This application claims the benefit of Korean Patent Application No. 10-2008-0112872, filed on Nov. 13, 2008, in the Korean Intellectual Property Office, the disclosure of which is incorporated herein, by reference.

BACKGROUND

1. Field

The present teachings relate to an organic electrolytic solution and a lithium battery employing the organic electrolytic solution.

2. Description of the Related Art

Due to the recent widespread use of light weight and high-performance portable electronic devices, batteries having a high capacity and a high output are required. In order to obtain high-capacity batteries, active materials having a high capacity are used, or a method of increasing a charging voltage of the batteries is used.

Most of the high-capacity active materials are metals or alloys, which undergo relatively large volume changes during charging and discharging. In a batteries that are charged with a high voltage, the stability of the cathode active material is reduced, the decomposition of an electrolytic solution is increased, and discharging capacity decreases, when the batteries are stored at a high temperature.

SUMMARY

One or more exemplary embodiments of the present teachings provide an organic electrolytic solution including a novel compound.

One or more exemplary embodiments of the present teachings provide a lithium battery including the organic electrolytic solution.

One or more exemplary embodiments of the present teachings provide an organic electrolytic solution including: a lithium salt; an organic solvent; and a compound represented by Formula 1 below:

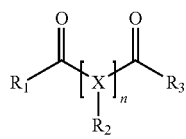

<Formula 1>

In Formula 1, $R_1$, $R_2$, and $R_3$ may be each independently a hydrogen atom, a C1 to C10 alkyl group, a C6 to C10 cycloalkyl group, a C6 to C10 aryl group, a C2 to C10 alkenyl group; or a C2 to C10 alkynyl group; X is $C(R_2)$ or nitrogen; and n is an integer in the range of 1 to 5.

One or more exemplary embodiments of the present teachings provide a lithium battery including: a cathode; an anode; and the organic electrolytic solution.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects will become apparent and more readily appreciated from the following description of the exemplary embodiments, taken in conjunction with the accompanying drawings, of which.

DETAILED DESCRIPTION

Figure 1:
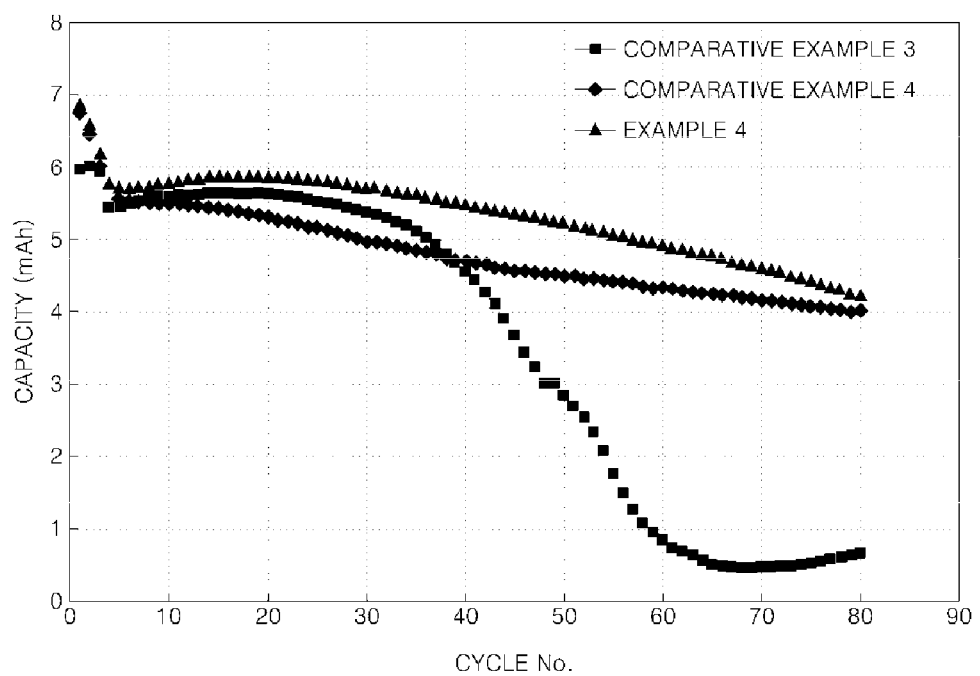
FIG. 1 is a graph illustrating a result of a charge-discharge experiment on a lithium battery, according to Example 4 of the present teachings.

Reference will now be made in detail to the exemplary embodiments of the present teachings, examples of which are illustrated in the accompanying drawings, wherein like reference numerals refer to the like elements throughout. The exemplary embodiments are described below, in order to explain the aspects of the present teachings, by referring to the figures.

An organic electrolytic solution, according to an exemplary embodiment of the present teachings, includes a lithium salt, an organic solvent; and a compound represented by Formula 1 below.

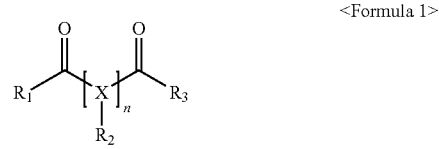

<Formula 1>

In Formula 1, R1, R2, and R3 may be each independently a hydrogen atom, a C1 to C10 alkyl group, a C6 to C10 cycloalkyl group, a C6 to C10 aryl group, a C2 to C10 alkenyl group; or a C2 to C10 alkynyl group; X is C(R2) or nitrogen; and n is an integer ranging from 1 to 5.

Due to the delocalization of electrons in two carbonyl groups included in the compound represented by Formula 1, the oxygen atoms may have a partial negative electric charge, and X may have a partial positive electric charge. The oxygen atoms combine with the lithium ions of an electrolytic solution, and the combined oxygen and lithium ions combine with the negatively charged surface of a cathode, so that the lithium ions are absorbed into the surface of the cathode, thereby forming a film. The film, which includes the compound represented by Formula 1, suppresses a decomposition reaction, by which a polar organic solvent is oxidized on the surface of the cathode. Due to the suppression of the decomposition reaction, the cycle life of a battery employing the organic electrolytic solution may be improved. In addition, the film suppresses the dissolution of metal ions from the cathode to the electrolytic solution, and thus, may prevent an increase in the resistance of the battery.

The compound represented by Formula 1 may form a part of a solid electrolyte interface (SEI), which is formed on the surface of an electrode, during initial charging and discharging. Accordingly, the compound represented by Formula 1 changes the composition of the SEI, which is conventionally formed of only a polar organic solvent. Thus, the solidity of the SEI may be maintained for many charging and discharging cycles. Since the film and SEI may effectively prevent an organic solvent, which solvates lithium ions, from entering into the cathode during the intercalation of the lithium ions, direct contact between the organic solvent and the cathode may be effectively prevented. Accordingly, batteries having improved cycle life may be secured.

On the other hand, a solid electrolyte film including the compound of Formula 1, in which X is nitrogen, is formed on the surface of the cathode. Therefore, there may be an increased amount of nitrogen on the surface of the cathode.

An organic electrolytic solution according to another exemplary embodiment may include a compound represented by any one of Formulae 2 to 7.

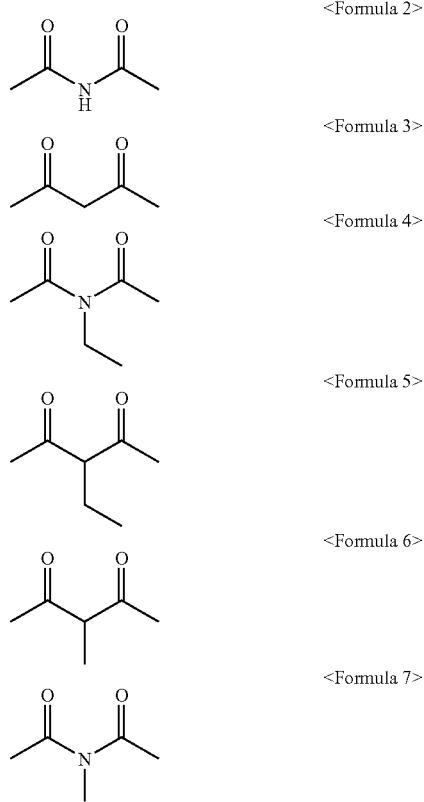

<Formula 2>
<Formula 3>
<Formula 4>
<Formula 5>
<Formula 6>
<Formula 7>

In the organic electrolytic solution, the amount of the compound represented by any one of Formulae 2 to 7 may be in the range of about 0.1 to about 10 parts by weight, based on 100 parts by weight of the organic solvent. For example, the amount of the compound may be in the range of about 0.5 to about 3 parts by weight.

The solvent used in the organic electrolytic solution may be a mixture of a high permittivity solvent and a low boiling point solvent. The high permittivity solvent may be γ-butyrolactone, or a cyclic carbonate, such as ethylene carbonate, propylene carbonate, or butylene carbonate, but is not limited thereto. The high permittivity solvent may have a permittivity in the range of about 30 to about 100.

The low boiling point solvent may be: a chain carbonate, such as dimethyl carbonate, ethylmethyl carbonate, diethyl carbonate, and dipropyl carbonate; dimethoxyethane; or diethoxyethane or a fatty acid ester derivative thereof, but is not limited thereto. The boiling point of the low boiling point solvent may be in the range of about 77 to about 150° C. In the mixture of the high permittivity solvent and the low boiling point solvent, two or more solvents may be mixed.

The lithium salt in the organic electrolytic solution may include one or more compounds selected from the group consisting of $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$, but is not limited thereto. The concentration of the lithium salt in the organic electrolytic solution may be in the range of about 0.5 to about 2 M.

Figure 2:
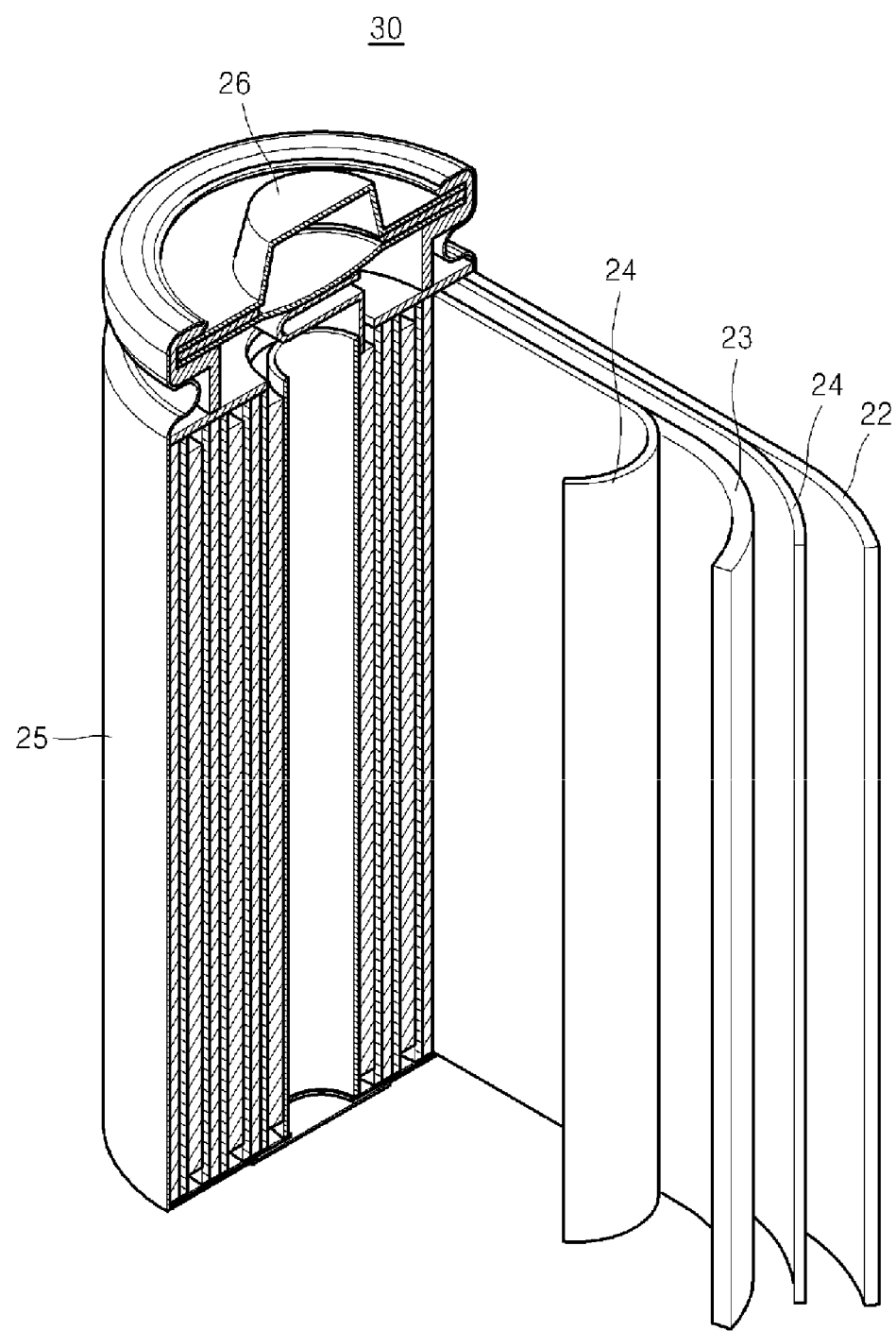
FIG. 2 is a schematic perspective view of a lithium battery, according to an exemplary embodiment of the present teachings.

FIG. 2 is a schematic perspective view of a lithium battery 30, according to an exemplary embodiment of the present teachings. Referring to FIG. 2, the lithium battery 30 includes a cathode plate 23, an anode plate 22, a separator 24 disposed between the cathode plate 23 and the anode plate 22, an organic electrolyte solution (not shown), a battery container 25, and a sealing member 26 to seal the battery container 25.

The lithium battery 30 may be manufactured as follows. First, a cathode active material, a conductive material, a binder, and a solvent are mixed to prepare a cathode active material composition. The cathode active material composition is directly coated on an aluminum current collector and then dried to prepare the cathode plate 23. Alternatively, the cathode active material composition may be cast on a separate support, removed from the support, and then laminated on an aluminum current collector, to prepare the cathode plate 23.

The cathode active material may be any lithium-containing metal oxide that is commonly used in the art and may be, for example, $Li_{1+x}NiCoMnO_2$ (0<x<0.5), $xLi_2MnO_{3-}(1-x)LiMeO_2$ (Me=Mn, Co, Ni, or a mixture thereof, 0<x<1), $LiCoO_2$, $LiMn_xO_{2x}$ (x=1, 2), $LiNi_{x-1}Mn_xO_{2x}$ (x=1 or 2), or $Ni_{1-x-y}Co_xMn_yO_2$ (0≦x≦0.5, 0≦y≦0.5).

The conductive material may be carbon black. The binder may be a vinylidenefluoride/hexafluoropropylene copolymer, polyvinylidenefluoride, polyacrylonitrile, polymethylmethacrylate, polytetrafluoroethylene, or any mixtures thereof, or a styrene butadiene rubber polymer. The solvent may be N-methylpyrrolidone, acetone, water, or the like. The amounts of the cathode active material, the conductive material, the binder, and the solvent are as commonly used in a lithium battery.

Similarly, an anode active material, a conductive material, a binder, and a solvent are mixed, to prepare an anode active material composition. Then, the anode active material composition is directly coated on a copper current collector, to prepare the anode plate 22. Alternatively, the anode material composition may be cast on a separate support, removed from the support, and then laminated on the copper current collector, to prepare the anode plate 22. The amounts of the anode active material, the conductive material, the binder, and the solvent are as commonly used in a lithium battery.

The anode active material may be a silicon/carbon composite ($SiO_x$, 0<x<2), a silicon metal, a silicon thin film, lithium metal, a lithium alloy, a carbonaceous material, or graphite. The conductive material, the binder, and the solvent used in the anode active material composition may be the same as those used in the cathode active material composition. In some cases, pores may be formed in the electrode plates 22, 23, by adding a plasticizer to the cathode and anode active material compositions.

The separator 24 may be any separator commonly used in a lithium battery. In particular, the separator 24 may have a low resistance to the transfer of ions in an electrolyte and excellent electrolyte impregnation properties. For example, the separator 24 may be formed of glass fiber, polyester, Teflon, polyethylene, polypropylene, polytetrafluoroethylene (PTFE), or any combinations thereof. The separator 24 may be in the form of a non-woven fabric or a woven fabric. More specifically, a windable separator formed of a material, such as polyethylene, or polypropylene, may be used in a lithium ion battery. In a lithium ion polymer battery, a separator having excellent organic electrolyte impregnation properties may be used. The separator 24 may be manufactured as follows.

A polymer resin, a filler, and a solvent are mixed to prepare a separator composition. Then, the separator composition is directly coated on an electrode and then dried to form a separator film. Alternatively, the separator composition may be cast on a support, dried, removed from the support, and then laminated on an electrode.

The polymer resin is not particularly restricted and may be any material that may be used as a binder for an electrode plate. For example, a vinylidenefluoride/hexafluoropropylene copolymer, polyvinylidenefluoride, polyacrylonitrile, polymethylmethacrylate, or any mixtures thereof, may be used. In particular, a vinylidenefluoride/hexafluoropropylene copolymer having 8 to 25%, by weight, of hexafluoropropylene may be used.

The separator 24 is interposed between the cathode plate 23 and the anode plate 22, and the resultant is wound or folded to form an electrode assembly. The electrode assembly is encased in the battery container 25. The battery container 25 is shown as being cylindrical, but may also be rectangular in some aspects. The organic electrolyte solution is then injected into the battery container 25, thereby forming the lithium ion battery 30.

Alternatively, the electrode assembly is formed as a laminated bi-cell structure, which is impregnated with the organic electrolytic solution. The electrode assembly is put into a pouch, which is then sealed, thereby forming a lithium ion polymer battery.

Hereinafter, various examples of the present teachings and comparative examples will be described in detail. The following examples are for illustrative purposes and are not intended to limit the scope of the present teachings.

EXAMPLE 1

0.5 parts by weight of N-acetylacetamide and 1.3M LiPF$_6$ used as a lithium salt were added to 100 parts by weight of an organic solvent mixture, to prepare an organic electrolytic solution. The organic solvent mixture was 30% ethylene carbonate, 50% diethyl carbonate, and 20% ethyl methyl carbonate, by weight.

EXAMPLE 2

An organic electrolytic solution was manufactured in the same manner as in Example 1, except that the amount of the N-acetylacetamide was changed to 0.1 parts by weight.

EXAMPLE 3

An organic electrolytic solution was manufactured in the same manner as in Example 1, except that the amount of the N-acetylacetamide was changed to 10 parts by weight.

COMPARATIVE EXAMPLE 1

An organic electrolytic solution was manufactured in the same manner as in Example 1, except that the N-acetylacetamide was not added.

COMPARATIVE EXAMPLE 2

An organic electrolytic solution was manufactured in the same manner as in Example 1, except that 1 part by weight of N-methylacetamide was added instead of the N-acetyl amide.

EXAMPLE 4

An Li$_{1.25}$NiCoMnO$_2$ powdered a cathode active material, a binder including 5 wt % of polyvinylidenefluoride (PVdF) dissolved in N-methylpyrrolidone (NMP), and a conductive material (super P) were added to an agate mortar in the weight ratio of 94:3:3, and were mixed, thereby manufacturing a cathode slurry.

The cathode slurry was cast on an aluminum foil having a thickness of 15 μm, using a doctor blade, at intervals of 100 μm. The resultant was dried in an oven at 90° C., for 2 hours, so as to partly evaporate the NMP, and then dried in a vacuum oven at 120° C., for 2 hours, so as to completely evaporate the NMP. Then, the resulting material was rolled, to obtain a cathode having a thickness of 60 μm.

A silicon oxide (SiO) powdered anode active material and a binder including dissolved polyamideimide were added to an agate mortar in a weight ratio of 90:10, and were mixed, thereby manufacturing an anode slurry. The slurry was cast on a copper foil having a thickness of 10 μm, using a doctor blade, at intervals of 60 μm. The resultant was dried in an oven at 90° C., for 2 hours, rolled to have a thickness of 47 μm, and then cured in a vacuum oven at 200° C., for 1 hour, thereby obtaining an anode.

The anode, the cathode, a polyethylene (Celgard) separator, and the organic electrolytic solution obtained in Example 1 were used to manufacture 2032 coin cells.

EXAMPLES 5 AND 6

Coin cells were manufactured in the same manner as in Example 4, except that the organic electrolytic solutions obtained in Examples 2 and 3 were used, instead of the organic electrolytic solution obtained in Example 1.

COMPARATIVE EXAMPLE 3

Coin cells were manufactured in the same manner as in Example 4, except that the organic electrolytic solution obtained in Comparative Example 1 was used, instead of the organic electrolytic solution obtained in Example 1.

COMPARATIVE EXAMPLE 4

Coin cells were manufactured in the same manner as in Example 4, except that the organic electrolytic solution obtained in Comparative Example 2 was used, instead of the organic electrolytic solution obtained in Example 1.

EVALUATION EXAMPLE 1

Cycle Characteristics Test of Battery

The coin cells manufactured according to Example 4 and Comparative Examples 3-4 were, in a first cycle, charged at a rate of 0.05 C, until the voltage reached 4.53 V, and then were discharged at the rate of 0.05 C, until the voltage reached 2.5 V. In a second cycle, the coin cells were charged at the rate of 0.1 C, until the voltage reached 4.50 V. Here, the coin cells were charged until the current reached 0.05 C, while maintaining the voltage at 4.50 V, and then were discharged at the rate of 0.1 C, until the voltage reached 2.5 V. In a third cycle, the coin cells were charged at the rate of 0.5 C, until the voltage reached 4.50 V. Here, the coin cells were charged until the current reached 0.05 C, while maintaining the voltage at 4.50 V, and then were discharged at the rate of 0.1 C, until the voltage reached 2.5 V. In fourth to eightieth cycles, the coin cells were charged at the rate of 0.8 C, under the same condition as above, and were discharged at the rate of 1 C, until the voltage reached 2.5 V. The discharge capacity in the third cycle is assumed to be a standard capacity.

After the coin cells were charged in the fourth cycle, the charged coin cells were stored in an oven at 90° C., for 4 hours, and then were taken out to carry out a discharging process in the fourth cycle. The discharge capacity in the fourth cycle, after the coin cells were taken out from the oven, was assumed to be a recovery discharge capacity. The charge/discharge results are shown in Table 1 and FIG. 1. Capacity retention ratios after storing the coin cells at a high temperature, and capacity recovery ratios after storing the coin cells at a high temperature, are defined in Equations 1 through 3 below.

Capacity retention ratio after storing the coin cells at a high temperature [%]=4th cycle discharge capacity/standard capacity  <Equation 1>

Capacity recovery ratio after storing the coin cells at a high temperature [%]=5th cycle discharge capacity/standard capacity  <Equation 2>

80th cycle capacity retention ratio [%]=80th cycle discharge capacity/4th cycle discharge capacity  <Equation 3>

TABLE 1

|  | Example 4 | Comparative Example 3 | Comparative Example 4 |
|---|---|---|---|
| standard capacity [mAh] | 6.36 | 5.96 | 6.35 |
| 4th cycle charge capacity [mAh] | 7.13 | 6.80 | 7.18 |
| 4th cycle discharge capacity [mAh] | 4.67 | 4.39 | 3.53 |
| 5th cycle discharge capacity [mAh] | 5.72 | 5.50 | 5.30 |
| Capacity recovery ratio after storing the battery at a high temperature [%] | 89.94 | 92.28 | 83.46 |
| Capacity retention ratio after storing the battery at a high temperature [%] | 73.43 | 73.66 | 55.59 |
| Voltage of open circuit before storing the battery at 90° C. for 4 hours (Voltage of open circuit after discharging in the 3rd cycle) | 4.335 | 4.357 | 4.310 |
| Voltage of open circuit after storing the battery at 90° C. for 4 hours (Voltage of open circuit after discharging in the 4th cycle) | 4.106 | 4.122 | 4.048 |
| Voltage difference of open circuit before and after storing the battery at 90° C. for 4 hours | 0.229 | 0.235 | 0.262 |
| 80th cycle capacity retention ratio [%] | 73 | 12 | 72 |

As shown in Table 1, the coin cell of Example 4, using the organic electrolytic solution according to an exemplary embodiment of the present teachings, had a much better 80th cycle capacity retention ratio than the coin cell of Comparative Example 3. The capacity recovery ratio and the capacity retention ratio of Example 4, after storing the coin cell at a high temperature, were higher than those of Comparative Example 4. A reduction in the open circuit voltage of Example 4 was suppressed, as compared with Comparative Examples 3 and 4.

As described above, according to the one or more of the above exemplary embodiments, a lithium battery employing a new organic electrolytic solution has improved high-temperature stability and cycle life characteristics.

Although a few exemplary embodiments of the present teachings have been shown and described, it would be appreciated by those skilled in the art that changes may be made in these exemplary embodiments, without departing from the principles and spirit of the invention, the scope of which is defined in the claims and their equivalents.

What is claimed is:

1. An organic electrolytic solution, comprising:
a lithium salt;
an organic solvent; and
a compound represented by Formula 1 below:

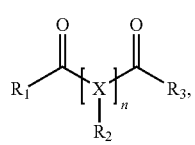

<Formula 1> wherein $R_1$ and $R_3$ are each independently a hydrogen atom, a C1 to C10 alkyl group, a C6 to C10 cycloalkyl group, a C6 to C10 aryl group, a C2 to C10 alkenyl group, or a C2 to C10 alkynyl group; $R_2$ is a C1 to C10 alkyl group, a C6 to C10 cycloalkyl group, a C6 to C10 aryl group, a C2 to C10 alkenyl group, or a C2 to C10 alkynyl group; X is nitrogen; and n is an integer ranging from 1 to 5.

2. The organic electrolytic solution of claim 1, wherein the compound represented by Formula 1 is one of the compounds represented by Formulae 4 or 7:

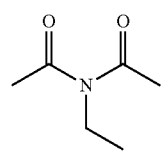

<Formula 4>

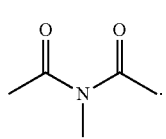

<Formula 7>

3. The organic electrolytic solution of claim 1, wherein the amount of the compound represented by Formula 1 is in the range of about 0.1 to about 10 parts by weight, based on 100 parts by weight of the organic solvent.

4. The organic electrolytic solution of claim 1, wherein the concentration of the lithium salt is in the range of about 0.5 M to about 2 M.

5. The organic electrolytic solution of claim 1, wherein organic solvent comprises a high permittivity solvent and a low boiling point solvent.

6. The organic electrolytic solution of claim 5, wherein the high permittivity solvent comprises at least one of the ethylene carbonate, propylene carbonate, butylene carbonate, and γ-butyrolactone.

7. The organic electrolytic solution of claim 5, wherein the low boiling point solvent comprises at least one selected of dimethyl carbonate, ethylmethyl carbonate, diethyl carbonate, dipropyl carbonate, dimethoxyethane, diethoxyethane, and a fatty acid ester derivative.

8. A lithium battery comprising:
a cathode;

an anode; and
the organic electrolytic solution of claim 1.

9. A lithium battery comprising:
a cathode;
an anode; and
the organic electrolytic solution of claim 2.

10. A lithium battery comprising:
a cathode;
an anode; and
the organic electrolytic solution of claim 3.

11. A lithium battery comprising:
a cathode;
an anode; and
the organic electrolytic solution of claim 4.

12. A lithium battery comprising:
a cathode;
an anode; and
the organic electrolytic solution of claim 5.

13. A lithium battery comprising:
a cathode;
an anode; and
the organic electrolytic solution of claim 6.

14. A lithium battery comprising:
a cathode;
an anode; and
the organic electrolytic solution of claim 7.

* * * * *